United States Patent [19]

Kinbara et al.

[11] Patent Number: 4,515,575
[45] Date of Patent: May 7, 1985

[54] TORQUE TRANSMISSION SYSTEM

[75] Inventors: Hiroji Kinbara, Aichi; Kazuma Matsui, Toyohashi; Yoshiyuki Hattori, Toyoake; Hideyuki Hayakawa, Nishio; Masaaki Takizawa, Mishima; Masaru Tamura; Yasunobu Jufuku, both of Susono, all of Japan

[73] Assignees: Nippondenso Co., Ltd., Kariya; Toyota Jidosha Kogyo Kabushiki Kaisha, Toyota, both of Japan

[21] Appl. No.: 291,946

[22] Filed: Aug. 11, 1981

[30] Foreign Application Priority Data

Aug. 22, 1980 [JP] Japan ................... 55-116112

[51] Int. Cl.³ .............................. F16H 11/06
[52] U.S. Cl. ...................... 474/13; 474/11; 474/12
[58] Field of Search ............ 474/11, 13, 15, 12, 474/19, 21; 308/215, 202, 187

[56] References Cited

U.S. PATENT DOCUMENTS

| 746,198 | 12/1903 | Sweeney | 308/215 |
|---|---|---|---|
| 1,266,286 | 5/1918 | Lockwood | 308/215 |
| 1,358,444 | 11/1920 | Helmstaedter | 308/215 |
| 1,651,807 | 12/1927 | Chapman | 308/215 |
| 2,678,566 | 5/1954 | Oehrli | 474/15 |
| 2,709,372 | 5/1955 | Melone | 474/13 |
| 2,715,842 | 8/1955 | Homuth | 474/15 |
| 2,986,043 | 5/1961 | Jaulmes | 474/15 |
| 2,987,934 | 6/1961 | Thomas | 474/15 |
| 3,001,838 | 9/1961 | Lamson et al. | 308/215 |
| 3,281,191 | 10/1966 | Benson | 308/215 |
| 3,757,593 | 9/1973 | Svenson | 474/12 |
| 3,773,398 | 11/1973 | Sato | 308/215 |
| 3,808,900 | 5/1974 | Vadeboncoeur et al. | 474/13 |
| 3,894,440 | 7/1975 | Marceau | 474/11 |
| 4,028,953 | 7/1977 | Lavallee | 474/13 |
| 4,102,214 | 7/1978 | Hoff | 474/12 |
| 4,345,664 | 8/1982 | Anno et al. | 474/13 |
| 4,360,353 | 11/1982 | Hattori et al. | 474/12 |
| 4,364,735 | 12/1982 | Plamper et al. | 474/13 |
| 4,384,862 | 5/1983 | Nakane | 474/13 |
| 4,406,644 | 9/1983 | Kinbara et al. | 474/13 |

Primary Examiner—Lawrence J. Staab
Assistant Examiner—Michael D. Bednarek
Attorney, Agent, or Firm—Cushman, Darby & Cushman

[57] ABSTRACT

A torque transmission system has driving and driven pulley units around which an endless V-belt extends. Each pulley unit has a stationary pulley part rotatable with a shaft and a movable pulley part disposed to define with the stationary pulley part a circumferentially continuous groove for receiving the V-belt. The movable pulley parts of the pulley units are axially resiliently biased so that the radii of the circle along which the V-belt engages the driving and driven pulley units are varied to change the speed-change ratio of the transmission system. The movable pulley part of the driven pulley unit is axially shifted by the action of fly weights held between a stationary plate fixed to the shaft and a holder fixed to the movable pulley part. One of the holder, movable pulley part and stationary plate is provided with surfaces extending parallel to the axis of the shaft and directed radially inwardly to radially inwardly support the fly weights when they are centrifugally moved to their radially outermost positions whereby the axial thrust force imparted by the radially outward movement of the fly weights to the V-belt is limited.

16 Claims, 5 Drawing Figures

TORQUE TRANSMISSION SYSTEM

BACKGROUND OF THE INVENTION

Field of the Invention

The present invention relates to a torque transmission system of the type which utilizes driving and driven pulley units and an endless V-belt to transmit the torque of a shaft to another shaft. The transmission system of the present invention can be used, for example, to transmit the torque of an automotive engine to an auxiliary rotary devices or accessories, such as air pump, water pump, fan, compressor, alternator or the like.

In co-pending U.S. patent application Ser. No. 140,594 filed by Hattori et al on Apr. 15, 1980, there is disclosed a torque transmission system having driving and driven pulley units drivingly connected together by an endless V-belt. Each of the driving and driven pulley units has a stationary pulley rotatable with a shaft and a movable pulley disposed to define with the stationary pulley a circumferentially continuous groove for receiving the V-belt. The movable pulleys of the two pulley units are axially resiliently biased so that the radii of the circles along which the V-belt engages the driving and driven pulley units are varied to change the speed-change ratio of the transmission system. The driven pulley unit includes fly weights which are rotatable with the movable pulley of the driven pulley unit and centrifugally displaced radially outwardly to axially shift the movable pulley. The driving and driven pulley units are provided with cam mechanisms each comprising a cam member and a follower member. When the load on the driven pulley unit is suddenly varied, the cam mechanisms are operative to keep the rotational speed of the driven pulley unit constant irrespective of variation in the load on the driven pulley unit.

Another co-pending U.S. patent application Ser. No. 223,304 filed by Hattori et al on Jan. 8, 1981 also discloses a generally similar torque transmission system.

The disclosures in the earlier applications are incorporated herein by reference.

SUMMARY OF THE INVENTION

The present invention has its object to provide an improved torque transmission system.

The torque transmission system according to the present invention includes a pulley unit comprising a fixed pulley part fixed to a shaft for rotation therewith. A movable pulley part is disposed in axially opposite relationship to the fixed pulley part to cooperate therewith to define a circumferential belt-receiving groove and being movable in the axial direction of the shaft toward and away from the fixed pulley part to vary the width of the belt-receiving groove. A V-belt is received in the belt-receiving groove. A holder is fixed to the side of the movable pulley part opposite to the side thereof which is contacted by the V-belt. A fixed plate is secured to the shaft against axial movement and disposed axially outwardly of the holder. At least one fly weight is disposed between the holder and the fixed plate and centrifugally movable in the radial direction of the shaft to axially displace the holder and the movable pulley part relative to the fixed pulley part. One of the holder, the fixed plate and the movable pulley part provides a holding surface which is substantially parallel to the shaft and adapted to radially support the fly weight when the same is centrifugally moved to its radially outermost position.

The feature of the invention discussed above provides an advantage that the axial force imparted by the movable pulley part to the V-belt when the pulley unit is rotated at a high speed is limited to the force accorded with the load on the pulley unit to greatly increase the operative life of the V-belt. In addition, the force exerted to the fixed pulley part and to the movable pulley part is also reduced to permit the wall-thickness and the weight of each pulley part to be also reduced.

The above and other objects, features and advantages of the present invention will be made more apparent by the following description with reference to the accompanying drawings.

DESCRIPTION OF PREFERRED EMBODIMENTS

Figure 1:
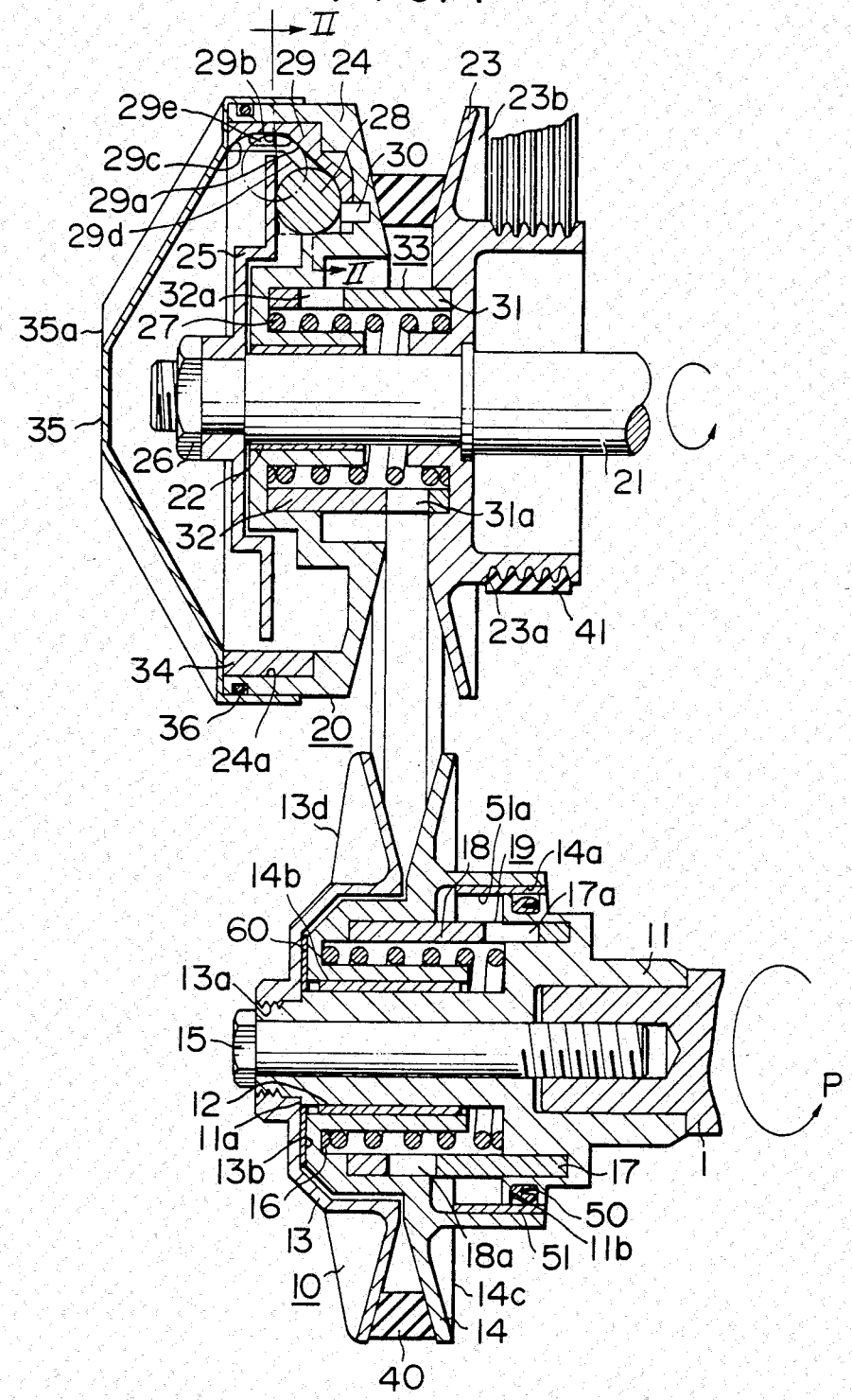
FIG. 1 is an axial sectional view of an embodiment of a torque transmission system according to the present invention.

Referring first to FIG. 1, reference numeral 1 designates a drive shaft which, in the illustrated embodiment of the invention, is a crank shaft of an automotive engine adapted to rotate in the direction indicated by an arrow P. A main shaft 11 is fixed to the drive shaft 1 by means of a bolt 15 and a key which is not shown. A dry bearing 12 is inserted into a bore in a movable pulley part 14 and mounted on the main shaft 11 for axial sliding movement thereon together with the pulley part 14. A fixed pulley part 13 has a central hole with internal screw threads 13a in threadable engagement with external screw threads on the outer end of the main shaft 11 so that the fixed pulley part 13 is fixed to the main shaft 11 for rotation therewith. The inner peripheral surface of the central hole in the fixed pulley part 13 includes a smooth cylindrical surface portion which is in intimate engagement with a mating cylindrical portion of the main shaft 11 to prevent vibration of the fixed pulley part 13. The fixed pulley part 13 has an inner end face 13b which is in intimate engagement with an annular shoulder 11a of the main shaft 11 to form a seal which prevents entry of water, dirt or the like. The fixed and movable pulley parts 13 and 14 constitute a driving pulley unit generally designated by reference numeral 10. The effective width and radius of the driving pulley unit 10 are variable. A preloaded spring 16 is provided to resiliently bias the movable pulley part 14 toward the fixed pulley part 13, i.e., in the direction to reduce the width of the groove formed between the two pulley parts. For diminishing the weight of the driving pulley unit 10, the fixed and movable pulley parts 13 and 14 are preferably made of a light-weight metal such as an aluminium alloy.

A stationary cam 17 is fixed to the main shaft 11 and has a cam surface 17a, while a movable cam 18 is fixed to the movable pulley part 14 and has a cam surface 18a of the same angle as the cam surface 17a of the stationary cam 17. The stationary cam 17 and the movable cam 18 in combination constitute a cam mechanism 19. The cam surfaces 17a and 18a are kept in contact with each other so that, when a relative movement is caused in the rotational direction between two cams 17 and 18, an axial thrust force is generated and acts on the cam surfaces 17a and 18a in accordance with the load torque by which the above-mentioned relative movement is caused. The magnitude of this axial thrust force is determined also by the angle of the inclination of the cam surfaces.

An oil seal 50 is received in a groove 11b formed in the outer peripheral surface of the main shaft 11 and has an outer peripheral surface in sliding contact with the inner peripheral surface 51a of a ring 51 press-fitted into a cylindrical opening 14a in the movable pulley part 14 so that the oil seal 50 is operative to seal the interior of the driving pulley unit 10 against water, dirt and dust. The ring 51 is made of a material harder than the pulley part 14, such as iron, for example.

A spacer 60 is interposed between the end face 14b of the movable pulley part 14 and the inner end face 13b of the fixed pulley part 13. The spacer 60 is formed from an elastic material having a low coefficient of friction, such as Teflon (trade name) or nylon, to prevent the end faces 14b and 13b of the movable and fixed pulley parts 14 and 13 from being damaged or worn when an impact or relative sliding movement occurs between the end faces of the pulley parts.

A driven shaft 21 is rotatably mounted on a stationary part such as engine block (not shown) by means of a bearing (not shown). A dry bearing 22 is slidably mounted on the driven shaft 21 as in the driving pulley unit 10 and carries a movable pulley part 24 fixed to the dry bearing 22 so that the movable pulley part 24 and the dry bearing 22 are axially slidable in unison relative to the driven shaft 21. A stationary or fixed pulley part 23 is secured to the shaft 21 by means of a key which is not shown. The fixed pulley part 23 has an outer peripheral surface in which are formed a series of V-shaped grooves 23a which engage or receive V-shaped ribs of a V-belt 41 to transmit the torque of the driven shaft 21 to an engine accessory such as air pump, water pump, cooling fan, compressor, alternator or the like.

The fixed and movable pulley parts 23 and 24 cooperate to form a driven pulley unit 20. As in the driving pulley unit 10, the fixed and movable pulley parts 23 and 24 of the driven pulley unit 20 are made of an aluminium alloy of a comparatively light weight and the width of the groove formed between the two pulley parts is variable to vary the effective diameter of the driven pulley unit. A pre-loaded spring 27 resiliently biases the movable pulley part 24 away from the fixed pulley part 23, i.e., in the direction to increase the width of the groove formed between the two pulley parts 23 and 24.

Figure 2:
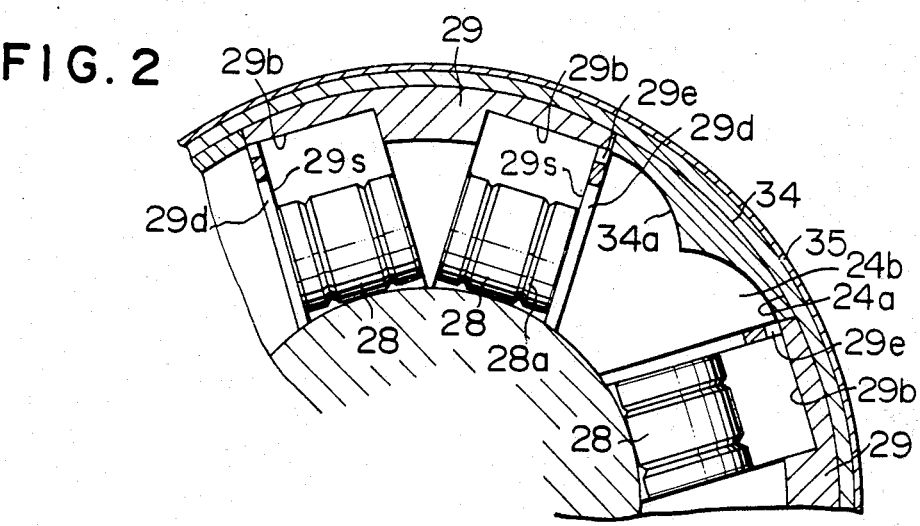
FIG. 2 is an enlarged fragmentary cross-sectional view of a movable pulley part of a driven pulley unit and fly weights incorporated therein taken along line II—II in FIG. 1.

A plurality of fly weights 28 each in the form of a roller are disposed in a space defined between a fixed plate 25 and a plurality of circumferentially spaced holders 29 having first inclined surfaces 29a (see FIG. 2). In the illustrated embodiment of the invention, eights fly weights 28 are provided in the driven pulley unit 20. The fixed plate 25 is secured to the driven shaft 21 by means of a nut 26. The holders 29 are fixed to the movable pulley part 24 by means of pins one of which is shown in FIG. 1 by reference numeral 30.

The fly weights 28 are rotatable with the movable pulley part 24 to centrifugally urge the holder 29 in the axial direction. In the outer peripheral surface of each fly weight 28, a plurality of circumferential grooves 28a (two grooves in the illustrated embodiment of the invention) are formed to retain lubricant therein, as will be best seen in FIG. 2. Each holder 29 is formed therein with a holding surface 29b which is contiguous with the inclined surface 29a and is parallel to the axis of the driven shaft 21. The holding surfaces of the holders 29 are adapted to be engaged by the outer peripheral surfaces of the fly weights 28 when they are centrifugally moved to their radially outermost positions. Each holder 29 is also provided with a second inclined surface 29c connected to the end of the holding surface 29b remote from the first inclined surface 29a. Each second inclined surface 29c is inclined in a direction substantially opposite to the direction of inclination of the associated first inclined surface 29a to cooperate therewith and also with the associated holding surface 29b to define a radially inwardly directed recess which is operative to retain or hold lubricant adjacent to the holding surface 29b.

Flanges 29d are provided along the radially extending side edges 20s of respective holders 29 to guide the radial movement of the fly weights 28, as best seen in FIG. 2. An aperture 29e is formed in the radially outer end portion of each flange 29d to communicate the space in each holder 29 adjacent to an associated holding surface 29b with a radially outwardly diverging space 24b defined between a circumferentially adjacent pair of holders 29. A generally arcuate lubricant guide wall 34 is disposed in the space 24b and extends along the inner peripheral surface 24a of the movable pulley part 24. The lubricant guide wall 34 has a pair of symmetrically arranged arcuate inner surfaces 34a which merge to form an apex positioned on the radial center line of the space 24b and which extend in generally circumferentially opposite directions to the points of associated holders 29 which are just radially inward of the apertures 29e formed in the flanges 29d, so that the lubricant oil is centrifugally moved along the surfaces 34a to the apertures 29e and thus introduced therethrough into the spaces in respective holders 29.

Again referring to FIG. 1, a fluid-sealing cover 35 is provided to cover the outer surface of the fixed plate 25 and secured to the outer peripheral surface of the movable pulley part 24 by means of screws (not shown). An annular groove is formed in the outer peripheral surface of the movable pulley part 24 to receive an O-ring 36 which is in sealing engagement with the inner peripheral surface of the cover 35 to prevent leakage of lubricant oil provided between the fly weights 28 and the holders 29 and between the fly weights 28 and the fixed plate 25.

Figure 3:
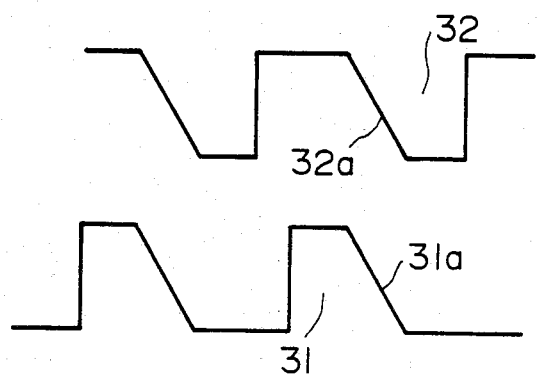
FIG. 3 is a developed view of a cam mechanism incorporated in the driven pulley unit.

A stationary cam 31 is fixed to the stationary pulley part 23 and, as will be seen in FIG. 3, has a cam surface 31a formed at a suitable inclination determined by a calculation as in the case of the stationary cam 17 of the driving pulley unit 10. It is to be noted, however, that the cam surface 31a is inclined in the direction opposite to the direction of the cam surface 17a of the stationary cam 17 of the driving pulley unit 10. A movalbe cam 32 is fixed to the movable pulley part 24 and has a cam surface 32a inclined at the same angle as the cam surface 31a of the stationary cam 31. The cams 31 and 32 cooperate to form a cam mechanism 33 of the driven pulley unit 20.

The driving and driven pulley units 10 and 20 are drivingly coupled by a V-belt 40 extending around these pulley units. The belt 40 is made from rubber reinforced with a strong core material.

Figure 4:
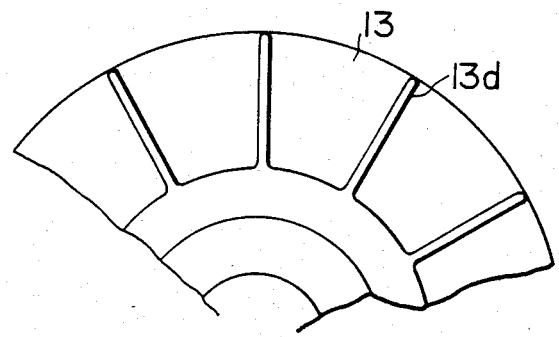
FIG. 4 is a fragmentary end view of a fixed pulley part of a driving pulley unit.

The stationary and movable pulley parts 13 and 14 of the driving pulley unit 10 are provided with radial cooling fins 13d and 14c formed on the outer end faces of these pulley parts, respectively. FIG. 4 shows a part of the fins 13d on the pulley part 13. The fixed pulley part 23 and the cover 35 of the driven pulley unit 20 are also provided with similar radial fins 23b and 35a formed on the axially outer end faces thereof, as in the case of the driving pulley unit 10. The number and heights of the fins 13d, 14c and 23b are decided also to increase the mechanical strengths of the pulley parts 13, 14 and 23.

As the engine is accelerated from the idling speed, the rotational speed of the driving pulley unit 10 and, hence, the rotational speed of the driven pulley unit 20 are increased, so that the centrifugal force acting on the fly weights 28 is increased correspondingly, with a resultant increase in the force component which tends to displace the fly weights radially outwardly against the inclined surfaces 29a of the holders 29 and axially shift them together with the movable pulley part 24 toward the stationary pulley part 23. The radial outward displacement of the fly weights and the axial displacement of the movable pulley part 24, however, do not take place until the sum of the forces of the springs 16 and 17 is overcome by the force component which is produced by the centrifugal force on the fly weights 28 and tends to axially displace the movable pulley part 24. Thus, the power transmission is carried out at a constant speed change ratio.

As the axial thrust force caused by the centrifugal force of the fly weights and acting on the movable pulley part 24 exceeds a force which is proportional to the sum of the biasing forces of the springs 16 and 27, the movable pulley part 24 is moved toward the stationary pulley part 23, so that the width of the groove formed between the pulley parts 23 and 24 of the driven pulley unit 20 is decreased to increase the diameter of the circle along which the V-belt 40 is frictionally and drivingly engaged with the pulley unit 20. This increase in the effective diameter of the driven pulley unit 20 natually increases the tension applied to the belt 40, so that the belt 40 comes deeper into the groove in the driving pulley unit 10 by forcibly displacing the movable pulley part 13 away from the stationary pulley part 14, so that the effective diameter of the driving pulley unit 10 is decreased.

Thus, the effective diameters or the distances between the points of contact of the belt with the pulley parts and the axes of the shafts are gradually varied in both pulley units 10 and 20 so that a substantially constant rotational speed is maintained at the driven pulley unit 20 irrespective of change of the rotational speed of the driving pulley unit 10.

As the engine speed is further increased, the width of the groove in the driving pulley unit 10 is maximized to minimize the effective diameter thereof, while the groove width in the driven pulley unit 20 is decreased to the minimum to maximize the effective diameter thereof. Thus, the maximum reduction ratio is obtained and, thereafter, the rotational speed of the driven pulley unit 20 is increased in proportion to the rotational speed of the driving pulley unit 10, i.e., the engine speed. In other words, the torque of the engine is transmitted to the driven pulley unit 20 at the constant maximum speed reduction ratio.

When the rotation of the engine (i.e., the driving shaft 1) is abruptly decelerated from a high speed of rotation, the operational position of the driving pulley unit 10 is changed from the maximum width position to the minimum width position by an abrupt axial movement of the movable pulley part 14 toward the fixed pulley part 13. When the speed of the engine (i.e., the driving shaft 1) is suddenly or abruptly accelerated, the cam surfaces 17a and 18a of the cam members 17 and 18 are separated apart to produce a relative sliding movement between the inner end faces 13b and 14b of the fixed and movable pulley parts 13 and 14 of the driving pulley unit 10. The elastic spacer 60 disposed between the two pulley parts 13 and 14 acts as a shock absorber and is operative to absorb an impact which would otherwise be produced between the two pulley parts 13 and 14 when the width of the driving pulley 10 is abruptly minimized. The spacer 60 also functions to minimize the friction between the two pulley parts 13 and 14 to thereby prevent them from being worn. The width of the pulley unit 10 which has been initially set can remain unchanged for a long period of time, with a resultant advantage that the driving and driven pulley units 10 and 20 can have a predetermined speed change characteristic for a long period of time. In addition, the center position of the V-belt 40 extending around the driving and driven pulley units 10 and 20 is maintained substantially unchanged so as not to adversely affect the durability of the V-belt 40. The spacer 60 is further operative to absorb an impact noise and thus reduce the operation noise of the pulley unit 10.

Hereinafter, an explanation will be made as to the operation of the cam mechanism 33.

A sudden increase in the load of an accessory, which is imposed on the driven pulley unit 20 through the V-belts 41, causes a corresponding increase in the axial load acting on the cam surfaces 31a and 32a of the cams 31 and 32 of the cam mechanism 33. More specifically, since these cam surfaces are inclined relative to the axis of the driven shaft 21, as shown in FIG. 3, an axial force is generated by the sudden increase in the load of the accessory to add to the force of the spring 27 which tends to increase the width of the groove in the driven pulley unit 20. Thus, when the load of the accessory is increased abruptly, the cam mechanism 33 acts to produce an axial force to assist the spring 27 so that effective diameter of the driven pulley unit 20 is decreased. This is effective to reduce the variation in the rotational speed of the driven pulley unit 20 which would be caused by the abrupt change of the load of the accessory.

The fly weights 28 and the holders 29 of the driven pulley unit 20 will now be described hereunder. When the engine (i.e., the driving pulley unit 10) is rotated at a high speed so that the fly weights 28 are displaced to their radially outermost positions to render the driven pulley unit 20 to be of the minimum width, the fly weights 28 are held by the holders 29 with the peripheral surfaces of the fly weights being engaged by the holding surfaces 29b of the holders 29. With this operating position of the driven pulley unit 20, the force with which the movable pulley part 24 axially urges the belt 40 is independent of the speed of the engine (i.e., the speed of the driving pulley unit 10) and solely dependent on the load imparted by an accessory, so that the driven pulley unit 20 acts as a simple torque-transmission pulley and does not provide a speed-changing operation. Thus, the driven pulley unit 20 does not impart any unduly great axial force to the belt 40, with a resultant advantage that the operative life of the belt 40 is greatly prolonged.

In addition, the lubricant oil provided between the fly weights 28 and the holders 29 and between the fly weights and the fixed plate 25 can surely be retained in the grooves 28a in the outer peripheral surfaces of the fly weights 28 to facilitate smooth sliding movement of the fly weights relative to the holders 29 and the fixed plate 25 and prevent the occurence of any sticking therebetween. The lubricant oil which is contained in the space 24b between each circumferentially adjacent pair of holders 29 and centrifugally forced radially outwardly against the guide wall 34 inside the inner peripheral surface 24a of the movable pulley part 24 is circumferentially guided by the arcuate guide surfaces 34a of the guide wall 34 to the apertures 29e formed in the flanges 29a. Thus, the lubricant oil flows through these apertures 29e to the holding surfaces 29b of the holders 29 and is retained adjacent to these holding surfaces 29b by the functions of the first and second inclined surfaces 29a and 29c of the holders 29. It will be understood, accordingly, that when the engine (i.e., the driving pulley unit 10) is rotated at a high speed and the fly weights 28 are engaged with the holding surfaces 29b of the holders 29, the lubricant oil is gathered to the holding surfaces 29b to sufficiently lubricate the fly weights 28 and the associated components 25 and 29. Thus, the above described structure of the driven pulley unit 20 assures that a small amount of lubricant oil can be enough to provide sufficient lubrication between the sliding surfaces of the driven pulley unit.

The fins 13d, 14c and 23b formed on the axially outer end faces of the fixed and movable pulley parts 13 and 14 of the driving pulley unit 10 and of the driven pulley unit 20 are operative to radiate the heat produced during the operation of the system between the belt 40 and the pulley units 10 and 20 so that the belt 40 is prevented from being heated to an unduly high temperature and thus can have a prolonged operative life. Similarly, the fins 35a formed on the cover 35 are operative to radiate the heat produced in the space defined between the cover 35 and the movable pulley part 24 so that the lubricant oil applied to the sliding surfaces of the fly weights 28 can be prevented from being heated to an unduly high temperature. Thus, the durability of the lubricant oil is improved to assure that the fly weights 28 can be prevented from being stuck to associated machine parts.

In the illustrated embodiment of the invention, since the stationary pulley part 13 of the driving pulley unit 10 is directly screwed over the main shaft 11 and fastened thereto, the use of any other fastening means such as key, nut, seal and the like can be eliminated to advantageously reduce the number of the necessary component parts and thus decreases the weight of the system. In addition, the pulley part 13 can easily be screwed over the main shaft 11 to greatly simplify the assemblying operation. Moreover, the ends 11a and 13b of the fixed pulley part 13 and the shaft 11 are in direct metal-to-metal sealing engagement with each other to form a reliable seal against water and dust for thereby improving the durability of the system. The ring 51 of a hard metal fitted to the inner peripheral surface 14a of the movable pulley part 14 provides a wear-resistant surface of contact with the oil seal 50 to cooperate therewith to provide an effective seal against water and dust for thereby improving the durability of the system. The use of an aluminium alloy as the material of the pulley parts 13, 14, 23 and 24 greatly reduces the weight of the system.

The embodiment of the invention described above may have various modifications which will be discussed hereunder.

The ring 51, which has been described as being press-fitted into the movable pulley part 14, may alternatively be adhesively secured to the pulley part 14. Further alternatively, the ring 51 may be integrally embedded into the pulley part 14 when the same is cast.

The spacer 60, which has been illustrated as being interposed between the end faces 14b and 13b of the movable pulley part 14 and the fixed pulley part 13, may alternatively be prepared by applying an adhesive coating onto one of the end faces 13b and 14b of the pulley parts 13 and 14. Further alternatively, the spacer 60 may be prepared by impregnating the end faces 13b and 14b of the pulley parts 13 and 14 with a plastic material such as Teflon.

The lubricant grooves 28a, which have been described as being formed in the outer peripheral surfaces of the fly weights 28, may be replaced by shallow recesses or dimples formed in the outer peripheral surfaces of the fly weights. The lubricant grooves 28a may further alternatively be formed in the holders 29 and/or fixed plate 25.

The lubricant guide wall 34, which has been illustrated as being prepared separately of the movable pulley part 24 of the driven pulley unit 10, may alternatively be prepared integrally with the movable pulley part 24 and also act as means for positioning an adjacent pair of holders 29.

The holders 29 have been described as being provided with the first inclines surfaces 29a, the holding surfaces 29b and the second inclined surfaces 29c. The holders 29, however, may be modified to have the first inclined surfaces 29a only. In this modification, the holding surfaces 29b may be formed in the inner peripheral surface 24a of the movable pulley part 24 and the second inclined surfaces 29c may be provided either in the inner peripheral surface 24a of the movable pulley part 24 or in the inner surface of the cover 35.

In the illustrated embodiment of the invention, the fly weights 28 are disposed in the driven pulley unit 20. However, the fly weights may alternatively be disposed in the driving pulley unit 10. In addition, it has been described that the torque transmission system is to transmit the torque of an internal combustion engine to an engine accessory. The torque transmission system of the present invention, however, may be used for any other purpose.

Figure 5:
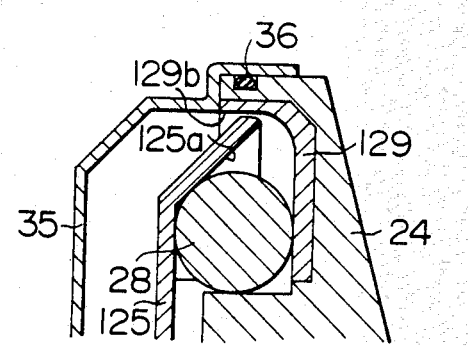
FIG. 5 is an enlarged fragmentary axial sectional view of the driven pulley unit of a second embodiment of the present invention.

In the illustrated embodiment of the invention, moreover, the first inclined surfaces 29a for converting the centrifugal force of the fly weights 28 into axial thrust force to axially displace the movable pulley part 24 are formed on the holders 29. The arrangement may be modified as shown in FIG. 5 wherein each of the holders 129 is provided with the holding surface 129b only and, instead, the fixed plate 125 is provided with inclined surfaces 125a. In addition, the holding surfaces 129b may alternatively be provided on the fixed plate 125 rather than on the holder 129.

As described above, the torque transmission system according to the present invention is arranged such that, when the pulley units are rotated at a so high speed that the fly weights 28 are centrifugally moved to their radially outermost positions, the fly weights are radially inwardly supported by holding surfaces which are provided by one the holder, the movable pulley part and the fixed plate. Accordingly, the axial force which is applied to the belt when the pulley units are rotated at a high speed can be limited to a small magnitude which is accorded to the load, whereby the operative life of the belt can advantageously be greatly prolonged. In addition, the fixed and movable pulley units are subjected to reduced axial forces and, thus, can be of thin-walled and light-weight structure.

What is claimed is:

1. A torque transmission system including: a pulley unit comprising a fixed pulley part fixed to a shaft for rotation therewith a movable pulley part disposed in axially opposite relationship to said fixed pulley part to cooperate therewith to define a circumferential belt-receiving groove and being movable in the axial direction of said shaft toward and away from said fixed pulley part to vary the width of said belt-receiving groove; a V-belt received in said belt-receiving groove; circumferentially spaced holders fixed to the side of said movable pulley part opposite to the side thereof which is contacted by said V-belt; a fixed plate fixed to said shaft against axial movement and disposed axially outwardly of said holders; at least one fly weight disposed between each of said holders and said fixed plate and being centrifugally movable in the radial direction of said shaft to axially displace said holder and said movable pulley part relative to said fixed pulley part; one of each holder, said fixed plate and said movable pulley part providing a holding surface substantially parallel to said shaft, said holding surface being adapted to radially support said fly weight when the same is centrifugally moved to its radially outermost position; each of said holders being provided with substantially radially extending side edges and with flanges extending along said side edges for guiding radial movement of said fly weight; adjacent flanges of each circumferentially adjacent pair of holders defining therebetween a generally radially extending space and being provided with means for communicating the interiors of said holders with said radially extending space; said communicating means disposed in said flanges adjacent to said holding surface; said movable pulley part being provided with a lubricant guiding wall faced to each of the radially extending spaces and circumferentially adjacent pair of holders for centrifugally guiding lubricant to said communicating means.

2. A torque transmission system as claimed in claim 1, wherein said fixed plate is provided with a surface inclined toward said fly weight.

3. A torque transmission system according to claim 1, wherein said lubricant guiding wall provides a pair of surfaces faced to said radially extending space and extending substantially symmetrically from said communicating means to a point disposed radially inwardly of said communication means.

4. A torque transmission system as claimed in claim 3, wherein said holder is provided with a surface inclined toward said fly weight and disposed adjacent to one end of said holding surface.

5. A torque transmission system as claimed in claim 4, wherein said holder is provided with an additional surface inclined toward said fly weight and disposed adjacent to the other end of said holding surface.

6. A torque transmission system as claimed in claim 3, wherein said holder is provided with said holding surface.

7. A troque transmission system according to any one of claims 3, wherein one of said fly weight, said holder and said fixed plate is provided with recess means for retaining lubricant therein.

8. A torque transmission system according to claim 3, wherein the communicating means of each flange comprises an aperture formed in the flange.

9. A torque transmission system comprising:
a driving pulley unit and a driven pulley unit;
each of said driving and driven pulley units including a fixed pulley part fixed to a shaft for rotation therewith, a movable pulley part disposed in axially opposite relationship to said fixed pulley part to cooperate therewith to define a circumferentially extending belt-receiving groove and being movable in the axial direction of said shaft toward and away from said fixed pulley part to vary the width of said belt-receiving groove;
an endless V-belt extending around said driving and driven pulley units in frictional engagement with the fixed and movable pulley parts thereof;
one of said driving and driven pulley units including a series of a plurality of holders arranged about the axis of said shaft in circumferentially spaced relationship with each other and secured to the side of said movable pulley part opposite to the side thereof in engagement with said V-belt, a substantially circular fixed plate secured to said shaft coaxially thereof and disposed axially outwardly of said holders to cooperate therewith to define circumferentially spaced fly weight spaces therebetween, and fly weights disposed in said fly weight spaces and adapted to be centrifugally moved radially outwardly with respect to the axis of said shaft;
one of said series of holders and said fixed plate being provided with surfaces inclined to the axis of said shaft and directed generally toward said fly weights to convert the centrifugal radially outward movements of said fly weights into axial movement of said movable pulley part;
one of said series of holders, said movable pulley part and said fixed plate being provided with surfaces extending substantially parallel to the axis of said shaft and being radially inwardly directed for supporting said fly weights radially inwardly when said fly weights are centrifugally moved to their radially outermost positions;
each of said holders being provided with radial flanges extending along radially extending side edges of the holder to radially guide an associated fly weight;
each of the radial flanges of each holder cooperating with an adjacent radial flange of an adjacent holder to define a radially outwardly diverging space;
each of said radial flanges being provided with means for communicating the fly weight space in an associated holder with an adjacent radially outwardly diverging space;
said movable pulley part being provided with a lubricant guiding wall disposed in each of said radially outwardly diverging spaces for centrifugally guiding lubricant to the communicating means in the adjacent radial flanges.

10. A torque transmission system according to claim 9, wherein said inclined surfaces are formed on said holders.

11. A torque transmission system according to claim 9, wherein said inclined surfaces are formed on said fixed plate.

12. A torque transmission system according to claim 10, wherein said fly weight supporting surfaces are formed on said holders and are contiguous with said inclined surfaces, respectively.

13. A torque transmission system according to claim 9, wherein said lubricant guiding wall comprise a pair of surfaces disposed in said radially outwardly diverging lubricant space and extending substantially symmetrically from said communication means to a point disposed radially inwardly of said communicating means.

14. A torque transmission system according to claim 9, wherein at least the fixed pulley part of at least said driving pulley unit is provided with radial cooling fins.

15. A torque transmission system according to claim 9, wherein one of said driving and driven pulley units further includes a fluid-sealing cover secured to the axially outer end of the movable pulley part and covering the axially outer end face of said fixed plate, and wherein said cover is provided with radial cooling fins formed on the axially outer end face thereof.

16. A torque transmission system according to claim 9, wherein the communication means of each flange comprises an aperture formed in the flange.

* * * * *